US009109516B2

(12) United States Patent
Giencke et al.

(10) Patent No.: US 9,109,516 B2
(45) Date of Patent: Aug. 18, 2015

(54) METHOD FOR OPERATING AN INTERNAL COMBUSTION ENGINE, CONTROL UNIT, COMPUTER PROGRAM PRODUCT, COMPUTER PROGRAM, AND SIGNAL SEQUENCE

(75) Inventors: Martin Giencke, Frankfurt (DE); Stefan Sommer, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 531 days.

(21) Appl. No.: 13/441,155

(22) Filed: Apr. 6, 2012

(65) Prior Publication Data

US 2012/0277977 A1 Nov. 1, 2012

(30) Foreign Application Priority Data

Apr. 9, 2011 (DE) ........................ 10 2011 016 638

(51) Int. Cl.

| | |
|---|---|
| ***F02D 41/26*** | (2006.01) |
| ***G06F 17/00*** | (2006.01) |
| ***F02D 17/04*** | (2006.01) |
| ***F02D 41/00*** | (2006.01) |
| ***F02D 41/04*** | (2006.01) |
| ***F02D 41/06*** | (2006.01) |
| *F02N 99/00* | (2010.01) |
| *F02D 41/14* | (2006.01) |

(52) U.S. Cl.

CPC .............. *F02D 17/04* (2013.01); *F02D 41/009* (2013.01); *F02D 41/042* (2013.01); *F02D 41/065* (2013.01); *F02N 99/008* (2013.01); *F02D 41/0097* (2013.01); *F02D 2041/0095* (2013.01); *F02D 2041/1412* (2013.01); *F02N 99/006* (2013.01)

(58) Field of Classification Search

CPC ......... F02D 13/06; F02D 17/02; F02D 41/30; F02D 41/0025; F02D 41/0087; F02D 41/3094; F02N 11/0814; F02N 11/0855

USPC ......................... 701/103, 104, 107, 112–114; 123/179.3, 179.4, 179.16, 299, 198 D, 123/198 DA, 198 F

See application file for complete search history.

(56) References Cited

U.S. PATENT DOCUMENTS

| | | | | |
|---|---|---|---|---|
| 6,305,343 | B1 * | 10/2001 | Sato et al. | 123/198 DB |
| 6,854,523 | B2 * | 2/2005 | Takahashi | 172/3 |
| 7,210,443 | B2 * | 5/2007 | Shimokawa et al. | 123/179.4 |
| 2003/0060330 | A1 * | 3/2003 | Sato et al. | 477/174 |
| 2005/0103312 | A1 * | 5/2005 | Uchiyama | 123/457 |

(Continued)

FOREIGN PATENT DOCUMENTS

| | | | |
|---|---|---|---|
| DE | 10301191 | A1 | 7/2004 |
| DE | 10351891 | A1 | 6/2005 |

OTHER PUBLICATIONS

German Patent Office, German Search Report dated Dec. 19, 2011 for German Application No. 102011016638.6.

*Primary Examiner* — John Kwon
*Assistant Examiner* — Johnny H Hoang
(74) *Attorney, Agent, or Firm* — Ingrassia Fisher & Lorenz PC

(57) ABSTRACT

A method is provided for operating an internal combustion engine that includes, but is not limited to ascertaining a possible instant of a stoppage of the internal combustion engine and injecting fuel to fill a cylinder of the internal combustion engine. The injection performed shortly before the instant of the stoppage of the internal combustion engine.

20 Claims, 3 Drawing Sheets

(56) References Cited

U.S. PATENT DOCUMENTS

2006/0027208 A1* 2/2006 Pinkston ........................ 123/316
2006/0073937 A1* 4/2006 Tohta et al. ..................... 477/62
2008/0149073 A1* 6/2008 Seto .............................. 123/492
2010/0059021 A1* 3/2010 Rau et al. ...................... 123/478
2011/0287894 A1* 11/2011 Doering et al. ............... 477/183

* cited by examiner

METHOD FOR OPERATING AN INTERNAL COMBUSTION ENGINE, CONTROL UNIT, COMPUTER PROGRAM PRODUCT, COMPUTER PROGRAM, AND SIGNAL SEQUENCE

CROSS-REFERENCE TO RELATED APPLICATION

This application claims priority to German Patent Application No. 10 2011 016 638.6, filed Apr. 9, 2011, which is incorporated herein by reference in its entirety.

TECHNICAL FIELD

The technical field relates to a method for operating an internal combustion engine, a control unit, a computer program product, a computer program, and a signal sequence, with the aid of which an internal combustion engine, in particular a fuel supply and ignition of the internal combustion engine, can be operated.

BACKGROUND

Motor vehicles having an automated start/stop mechanism, a deactivation of the internal combustion engine and an activation of the internal combustion engine, which follows in a short time, can occur. For this purpose, the fuel supply of the internal combustion engine is interrupted, so that the internal combustion engine comes to a stop. To start the internal combustion engine, a crankshaft of the internal combustion engine is set into motion with the aid of an electrical drive unit, in order to suction an ignitable fuel/air mixture into cylinders of the internal combustion engine and start it. However, there is a need to improve the starting comfort of internal combustion engines.

It is at least one object of an embodiment to disclose measures with the aid of which good starting comfort of an internal combustion engine is made possible. In addition, other objects, desirable features and characteristics will become apparent from the subsequent summary and detailed description, and the appended claims, taken in conjunction with the accompanying drawings and this background.

SUMMARY

One embodiment relates to a method for operating an internal combustion engine, having the steps of ascertaining a possible instant of a stoppage of the internal combustion engine and injecting fuel to fill a cylinder of the internal combustion engine, the injection occurring shortly before the instant of the stoppage of the internal combustion engine.

Because fuel is introduced one more time shortly before the stoppage of the internal combustion engine, at least one cylinder can still be filled with a fuel/air mixture using the last rotations of the crankshaft before the stoppage, so that a cylinder having an ignitable mixture is already provided for a subsequent start of the internal combustion engine. This cylinder can be ignited essentially immediately after the detection of a starting request, so that the full power of the internal combustion engine is available particularly rapidly. Good starting comfort of an internal combustion engine is thus made possible. In particular, the energy introduction of an electrical drive unit, for example, an electrical starter or a starter generator, can be reduced, because a significantly smaller angular amount of a rotation of the crankshaft is already sufficient so that the internal combustion engine can be operated independently without the aid of the electrical drive unit. Because of the lower demand for electrical energy for the electrical drive unit, more start/stop procedures are possible for the internal combustion engine until a motor vehicle battery, which is connected to the electrical drive unit, must first be recharged. This allows a reduction of the fuel consumption and results in a reduction of $CO_2$ emissions. In particular, it is possible to start an internal combustion engine having intake manifold injection rapidly and comfortably, because the duration until the fuel/air mixture reaches a cylinder of the internal combustion engine from the intake manifold can be taken into consideration at the instant of the injection of the fuel. The ascertainment of the possible instant of the stoppage of the internal combustion engine can be performed in particular by a detection of the curve of the angle and/or the speed of a crankshaft of the internal combustion engine, in that, for example, the instant at which the stoppage of the internal combustion engine will be reached is preferably estimated by an extrapolation of the detected curve.

The injection preferably occurs one or two strokes before the instant of the stoppage of the internal combustion engine. This allows exclusively those cylinders of the internal combustion engine to be filled with an ignitable fuel/air mixture that are located during a following start of the internal combustion engine in a stroke phase that can provide a prompt power introduction upon immediate ignition. Fuel can thus be prevented from being moved unburned through a cylinder.

During a subsequent start of the internal combustion engine, the cylinder filled with fuel is preferably immediately ignited. In particular, if the information about which cylinder of the internal combustion engine is filled with an ignitable fuel/air mixture is available through the ascertainment of the possible instant of the stoppage of the internal combustion engine, it is not necessary to initiate an ignition in all cylinders as a precaution, but rather exclusively in the cylinder which is located in the stroke phase suitable for this purpose. Furthermore, the period of time of an activated electrical drive unit can be reduced.

Another embodiment relates to a method for operating an internal combustion engine, having the steps of monitoring the curve of the angle and/or the speed of a crankshaft of the internal combustion engine, storing the curve of the angle and/or the speed of the crankshaft over a defined minimum measuring period of time, in the case of a decelerating crankshaft, extrapolating the curve of the angle and/or the speed of the crankshaft, and determining the angle of the crankshaft upon an extrapolated stoppage of the crankshaft. This method and the refinements of the method described hereafter can particularly be combined with the above-described method.

This makes it possible to establish which cylinder of the internal combustion engine, upon the stoppage of the internal combustion engine, is located in a stroke phase, in particular intake or compression, which allows immediate ignition of a fuel/air mixture after the detection of a starting request of the internal combustion engine. The fuel/air mixture can have been suctioned in shortly before the stoppage of the internal combustion engine or can be introduced into the cylinder suitable for this purpose immediately after the detection of the starting request of the internal combustion engine. This cylinder can be ignited essentially immediately after the detection of the starting request, so that the full power of the internal combustion engine is available particularly rapidly. Good starting comfort of an internal combustion engine is thus made possible. Upon a deactivation of the internal combustion engine, the curve of the angle and/or the speed of the crankshaft is essentially linear, so that the angle of the crankshaft and therefore the stroke phase of the cylinders of the internal combustion engine can be estimated very precisely by an essentially linear extrapolation. This information can be stored, so that the correct cylinder can be identified immediately upon a start of the internal combustion engine. In particular, the energy introduction of an electrical drive unit can be reduced, since a significantly smaller angular amount of a rotation of the crankshaft is already sufficient so that the internal combustion engine can be operated independently without the aid of the electrical drive unit. Because of the lesser demand for electrical energy for the electrical drive unit, more start/stop procedures for the internal combustion engine are possible until a motor vehicle battery, which is connected to the electrical drive unit, must first be recharged. This allows a reduction of the fuel consumption and results in a reduction of $CO_2$ emissions.

In particular, a cylinder of the internal combustion engine which is located at the angle of the crankshaft upon an extrapolated stoppage of the crankshaft in its intake stroke or in its compression stroke is filled with fuel before the extrapolated stoppage of the crankshaft and is ignited immediately upon a subsequent start of the internal combustion engine. An ignitable fuel/air mixture is therefore already provided in the corresponding cylinder, which can be ignited immediately upon a start of the internal combustion engine.

A particularly bidirectional crankshaft sensor is preferably used to determine the possible instant of the stoppage of the internal combustion engine and/or to monitor the curve of the angle and/or the speed of a crankshaft. The curve of the angle and the speed of the crankshaft can be determined simply and precisely by the crankshaft sensor. With the aid of the bidirectional crankshaft sensor, the cylinder which is filled with an immediately ignitable fuel mixture can be unambiguously determined, so that it is not necessary to first wait through two compression strokes in order to find out which cylinder located essentially in the state of top dead center (TDC) is located in the ignition TDC or in the charge cycle TDC. This allows the cylinder located in the ignition TDC, having the ignitable fuel mixture, to be ignited immediately after actuating a starter and the internal combustion engine to be started at once.

Particularly preferably, measured values which were measured at a defined minimum period of time before the stoppage of the internal combustion engine are used to determine the possible instant of a stoppage of the internal combustion engine and/or to monitor the curve of the angle and/or the speed of a crankshaft. Irregularities of the crankshaft movement shortly before the stoppage thus cannot corrupt the measurement.

In particular, an ignition is exclusively initiated in the cylinder filled with fuel to start the internal combustion engine. Because it is known through the extrapolated determination of the angle of the crankshaft which cylinder of the internal combustion engine is filled with an ignitable fuel/air mixture, it is not necessary to initiate an ignition in all cylinders as a precaution, but rather exclusively in the cylinder which is located in the stroke phase suitable for this purpose. Furthermore, the period of time of an activated electrical drive unit can be reduced.

The internal combustion engine is preferably connected to an automatic start/stop mechanism. Due to the starting of the internal combustion engine shortly after a previous deactivation, it is particularly favorable for the starting comfort to be able to ignite a precisely identifiable cylinder which is filled with an ignitable fuel/air mixture.

One embodiment relates to a control unit for operating an internal combustion engine, in particular for performing the above-described method, comprising an input port for inputting measured values about the angle and/or the speed of a crankshaft of the internal combustion engine, a storage unit for storing a time curve of the angle and/or the speed of the crankshaft of the internal combustion engine, a computer unit for calculating a possible instant of a stoppage of the internal combustion engine and/or the angle of the crankshaft upon an extrapolated stoppage of the crankshaft, and an output port for controlling a fuel supply and/or for controlling an ignition of a cylinder of the internal combustion engine.

This allows, after the detection of a starting request of the internal combustion engine, an immediate ignition of a fuel/air mixture in a cylinder of the internal combustion engine to be performed. Good starting comfort of an internal combustion engine is thus made possible. The control unit can particularly be implemented and refined as described above on the basis of the method.

In particular, the input port and/or the output port are connected to a data bus, in particular a CAN bus. This allows the ascertained information about the angle of the crankshaft to also be provided to other vehicle components and/or to be compared to other data, for example, for a plausibility check. Additionally or alternatively, the input port and/or the output port can preferably be exclusively connected to an engine control unit, to be able to exchange data particularly rapidly.

The input port is preferably connected to an automatic start/stop mechanism of the internal combustion engine. A signal from an automatic start/stop mechanism can thus be considered promptly by the control unit, in order, in the event of a stop signal from the automatic start/stop mechanism, for example, to initiate measurements on the curve of the angle and/or the speed of the crankshaft and/or to determine an instant of the stoppage and/or to process the corresponding measurement results.

One embodiment relates to a computer program product having program code means, which are stored on a computer-readable data carrier, in order to perform the above-described method when the program product is executed on a computer, in particular a control unit. The control unit can be implemented and refined as described above. Good starting comfort of an internal combustion engine is made possible with the aid of the computer program product.

One embodiment relates to a computer program having coded instructions for performing the above-described method when the computer program is executed on a computer, in particular a control unit. The control unit can be implemented and refined as described above. Good starting comfort of an internal combustion engine is made possible with the aid of the computer program. The computer program can particularly be stored on the above-described computer program product, for example, a diskette, CD-ROM, DVD, memory, or a computer unit connected to the Internet. The computer program can particularly be designed as a compiled or uncompiled data sequence, which is preferably based on a higher-level, in particular object-based computer language, such as C, C++, Java, Smalltalk, Pascal, or Turbo Pascal.

One embodiment relates to a signal sequence having computer-readable instructions for performing the above-described method when the signal sequence is processed by a computer, in particular a control unit. The control unit can be implemented and refined as described above. Good starting comfort of an internal combustion engine is made possible with the aid of the signal sequence. The signal sequence can be generated in particular with the aid of the above-described computer program and/or with the aid of the above-described computer program product. The signal sequence can be provided as electrical pulses and/or electromagnetic waves and/or optical pulses in a wireless or wired manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
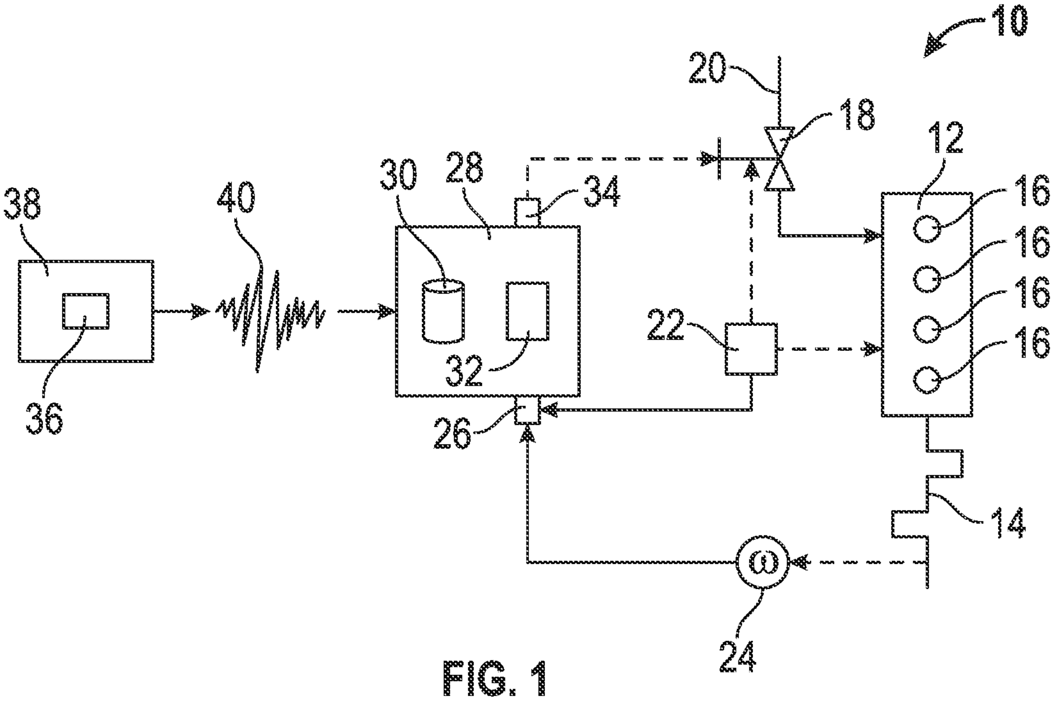
FIG. 1 shows a schematic diagram of a drivetrain.

The drivetrain 10 shown in FIG. 1 has an internal combustion engine 12 and a crankshaft 14, which is driven by the internal combustion engine 12. The internal combustion engine 12 has multiple cylinders 16, which can be filled with fuel by a fuel supply 18, in order to introduce a torque into the crankshaft 14 through combustion of a fuel/air mixture in the respective cylinder 16. For this purpose, fuel is injected by the fuel supply 18 in the illustrated embodiment into an intake manifold 20 leading to the internal combustion engine 12. Furthermore, an automatic start/stop mechanism 22, which is connected to the internal combustion engine 12, and which can automatically open and close the fuel supply 18, is provided.

The angle and the speed of the crankshaft 14 can be measured with the aid of a bidirectional crankshaft sensor 24 and supplied via an input port 26 to a control unit 28. The control unit 28 has a storage unit 30 for storing the measured data obtained from the crankshaft sensor 24 according to the FIFO principle. The data stored in the storage unit 30 can be processed by a computer unit 32, in order, in the event of a deactivation of the internal combustion engine triggered by the automatic start/stop mechanism 22, to be able to estimate the angle of the crankshaft 14 at the instant of the stoppage of the crankshaft 14, in particular by interpolation. In particular, the signals triggered by the automatic start/stop mechanism 22 can be input via the input port 26, in order to start the corresponding calculation and be able to react early. With the aid of the information calculated by the control unit 28, via an output port 34 of the control unit 28, the fuel supply 18 can be opened shortly before the stoppage of the internal combustion engine 12, so that a cylinder 16, which is located in an intake or compression stroke in the stoppage of the crankshaft 14, can be filled with an ignitable fuel/air mixture. Upon a subsequent start of the internal combustion engine 12, which is triggered by the automatic start/stop mechanism 22, this cylinder 16 can be ignited immediately, so that the full performance of the internal combustion engine 12 is available particularly rapidly and the start accordingly occurs comfortably.

The method according to which the control unit 28 operates can be stored as a computer program 36 on a computer program product 38 in the form of a data memory and can operate the control unit 28 as a signal sequence 40. The computer program product 38 can also be part of the control unit 28, for example, as a computer unit 32 of the control unit 28.

Figure 2:
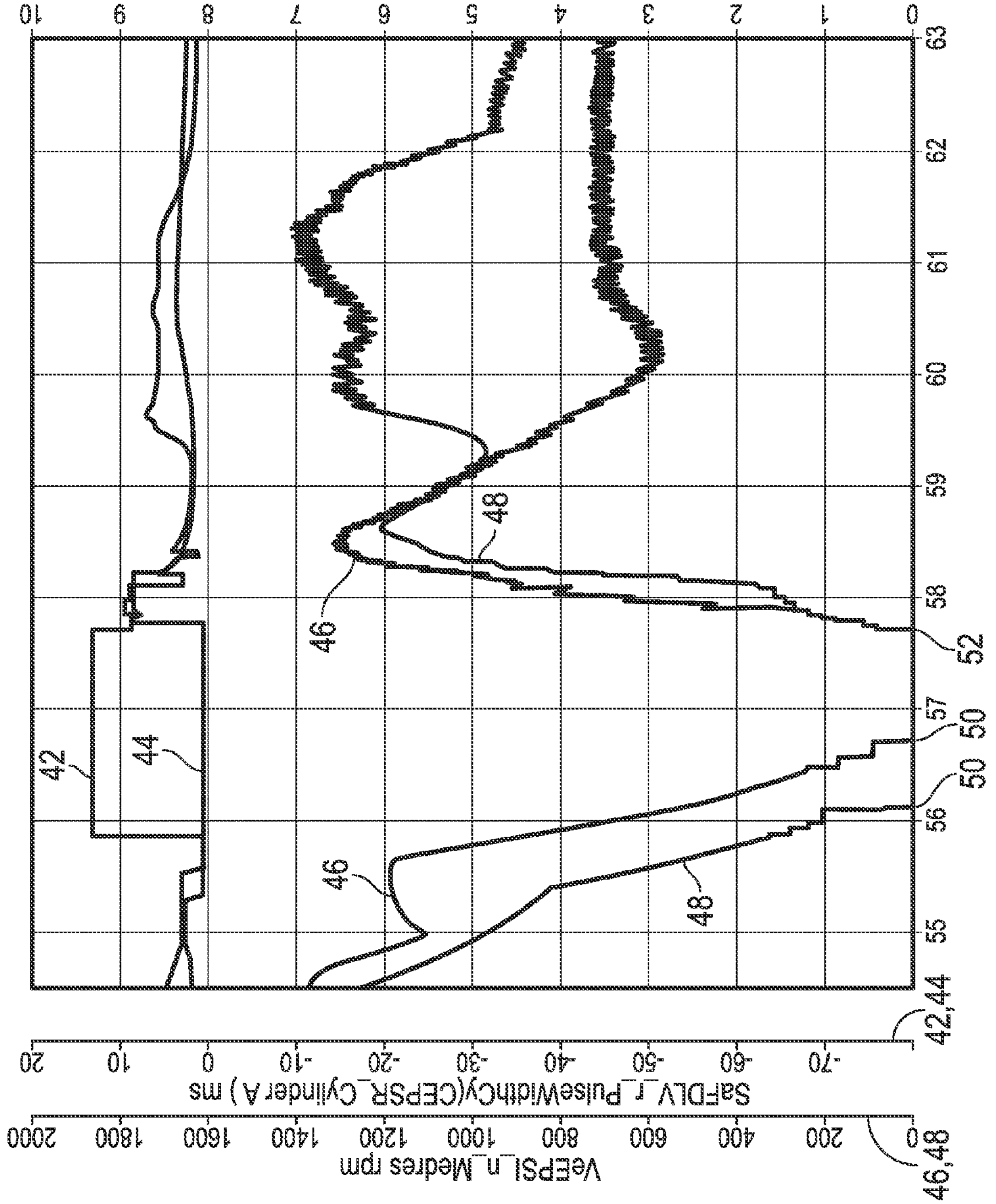
FIG. 2 shows a schematic graph of the time curve of parameters of the drivetrain shown in FIG. 1.

FIG. 2 shows the time curve of a fuel quantity 42 and the time curve of a fuel quantity 44 of a comparative example. An illustrated time curve of a speed 46 and a time curve of a speed 48 of the comparative example result therefrom. Before reaching a stoppage instant 50, in the invention, the fuel quantity 42 is increased, while in the comparative example the fuel quantity 44 is zero. At a common starting instant 52, the respective internal combustion engine 12 is started, the speed 46 increasing more rapidly than in the case of the speed 48 of the comparative example. Experiments have shown that in the case of the embodiments, the internal combustion engine 12 can be operated without the aid of an electrical starter approximately 150 ms more rapidly.

Figure 3:
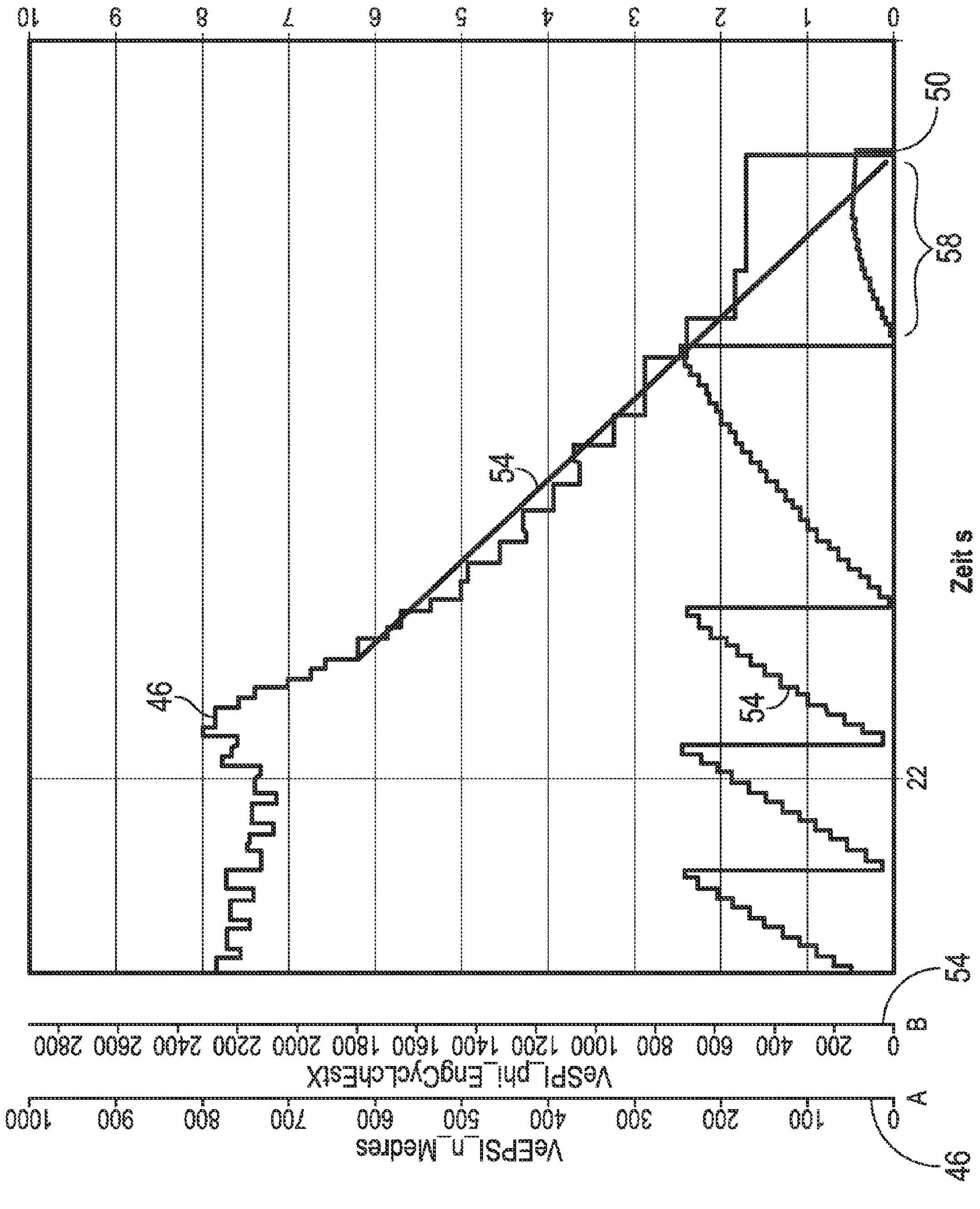
FIG. 3 shows a schematic graph of the time curve of further parameters of the drivetrain shown in FIG. 1.

As shown in FIG. 3, an angle 54 of the crankshaft 14 at the stoppage instant 50 can be determined very well by an extrapolation straight line 56. For this purpose, the curve of the speed 46 can be measured during the spinning down of the internal combustion engine 12 without fuel supply and extrapolated essentially linearly into the future, the corresponding angle 54 of the crankshaft being able to be estimated very precisely based on the stoppage instant 50 which can thus be calculated. A minimum period of time 58 before the stoppage instant 50 remains unconsidered in particular in this case, so that in particular irregularities shortly before the stoppage of the crankshaft 14 cannot impair the precision of the extrapolation. Furthermore, within the minimum period of time 58 after determining the extrapolation straight line 56, the injection of fuel can be stopped shortly before the stoppage instant 50, so that this injected fuel can still be suctioned into one of the cylinders 16.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating an internal combustion engine, comprising:

ascertaining an instant of a stoppage of the internal combustion engine; and injecting fuel to fill a cylinder of the internal combustion engine shortly before the instant of the stoppage of the internal combustion engine;

wherein the cylinder has a combustible air/fuel mixture therein when the internal combustion engine is stopped to enable a subsequent start of the internal combustion engine.

2. The method according to claim 1, wherein the injecting occurs at least one stroke before the instant of the stoppage of the internal combustion engine.

3. The method according to claim 1, further comprising immediately igniting the combustible air/fuel mixture in the cylinder filled with the fuel upon the subsequent start of the internal combustion engine.

4. The method according to claim 1, further comprising:

monitoring a curve of a parameter of a crankshaft of the internal combustion engine, storing the curve of the parameter of the crankshaft over a defined minimum measuring period of time;

extrapolating the curve of the parameter of the crankshaft for a decelerating crankshaft; and determining an angle of the crankshaft upon an extrapolated stoppage of the crankshaft for ascertaining the instant of a stoppage of the internal combustion engine.

5. The method according to claim 4, wherein a cylinder of the internal combustion engine, which at the angle of the crankshaft upon the extrapolated stoppage of the crankshaft is in an intake stroke, is filled with fuel before the extrapolated stoppage of the crankshaft and is ignited immediately upon a subsequent start of the internal combustion engine.

6. The method according to claim 4, wherein a particularly bidirectional crankshaft sensor is used to determine the instant of a stoppage of the internal combustion engine.

7. The method according to claim 4, wherein measured values that were measured a defined minimum period of time before a stoppage of the internal combustion engine are used to determine the instant of the stoppage of the internal combustion engine.

8. The method according to claim 5, wherein an ignition is initiated exclusively in the cylinder filled with the fuel to start the internal combustion engine.

9. The method according to claim 4, wherein the internal combustion engine is connected to an automatic start/stop mechanism.

10. A control unit for operating an internal combustion engine, comprising:

an input port configured to receive measured values about a parameter of a crankshaft of the internal combustion engine;

a storage unit configured to store a time curve of the parameter of the crankshaft of the internal combustion engine;

a computer unit configured to calculate a possible instant of a stoppage of the internal combustion engine upon an extrapolated stoppage of the crankshaft; and an output port configured to control a fuel supply and to inject fuel to fill a cylinder of the internal combustion engine shortly before the instant of the stoppage of the internal combustion engine and control an ignition of the cylinder of the internal combustion engine, wherein the cylinder has a combustible air/fuel mixture therein when the internal combustion is stopped to enable a subsequent start of the internal combustion engine.

11. The control unit according to claim 10, wherein the input port and the output port is connected to a data bus, in particular a CAN bus.

12. The control unit according to claim 11, wherein the data bus is a CAN bus.

13. The control unit according to claim 10, wherein the input port is connected to an automatic start/stop mechanism of the internal combustion engine.

14. A computer readable medium embodying a computer program product, said computer program product comprising:

an operating program for operating an internal combustion engine, the operating program configured to:

ascertain an instant of a stoppage of the internal combustion engine; and inject fuel to fill a cylinder of the internal combustion engine shortly before the instant of the stoppage of the internal combustion engine;

wherein the cylinder has a combustible air/fuel mixture therein when the internal combustion engine is stopped to enable a subsequent start of the internal combustion engine.

15. The computer readable medium embodying the computer program product according to claim 14, wherein the injecting occurs at least one stroke before the instant of the stoppage of the internal combustion engine.

16. The computer readable medium embodying the computer program product according to claim 14, the operating program further configured to ignite the combustible air/fuel mixture in the cylinder filled with the fuel upon the subsequent start of the internal combustion engine.

17. The computer readable medium embodying the computer program product according to claim 14, wherein the operating program is further configured to:

monitor a curve of a parameter of a crankshaft of the internal combustion engine, store the curve of the parameter of the crankshaft over a defined minimum measuring period of time;

extrapolate the curve of the parameter of the crankshaft for a decelerating crankshaft; and determine an angle of the crankshaft upon an extrapolated stoppage of the crankshaft for ascertaining the instant of the stoppage of the internal combustion engine.

18. The computer readable medium embodying the computer program product according to claim 17, wherein a cylinder of the internal combustion engine, which at the angle of the crankshaft upon the extrapolated stoppage of the crankshaft is in an intake stroke, is filled with fuel before the extrapolated stoppage of the crankshaft and is ignited immediately upon a subsequent start of the internal combustion engine.

19. The computer readable medium embodying the computer program product according to claim 17, wherein a particularly bidirectional crankshaft sensor is used to determine the instant of a stoppage of the internal combustion engine.

20. The computer readable medium embodying the computer program product according to claim 17, wherein measured values that were measured a defined minimum period of time before a stoppage of the internal combustion engine are used to determine the instant of the stoppage of the internal combustion engine.

* * * * *